Figure 1:
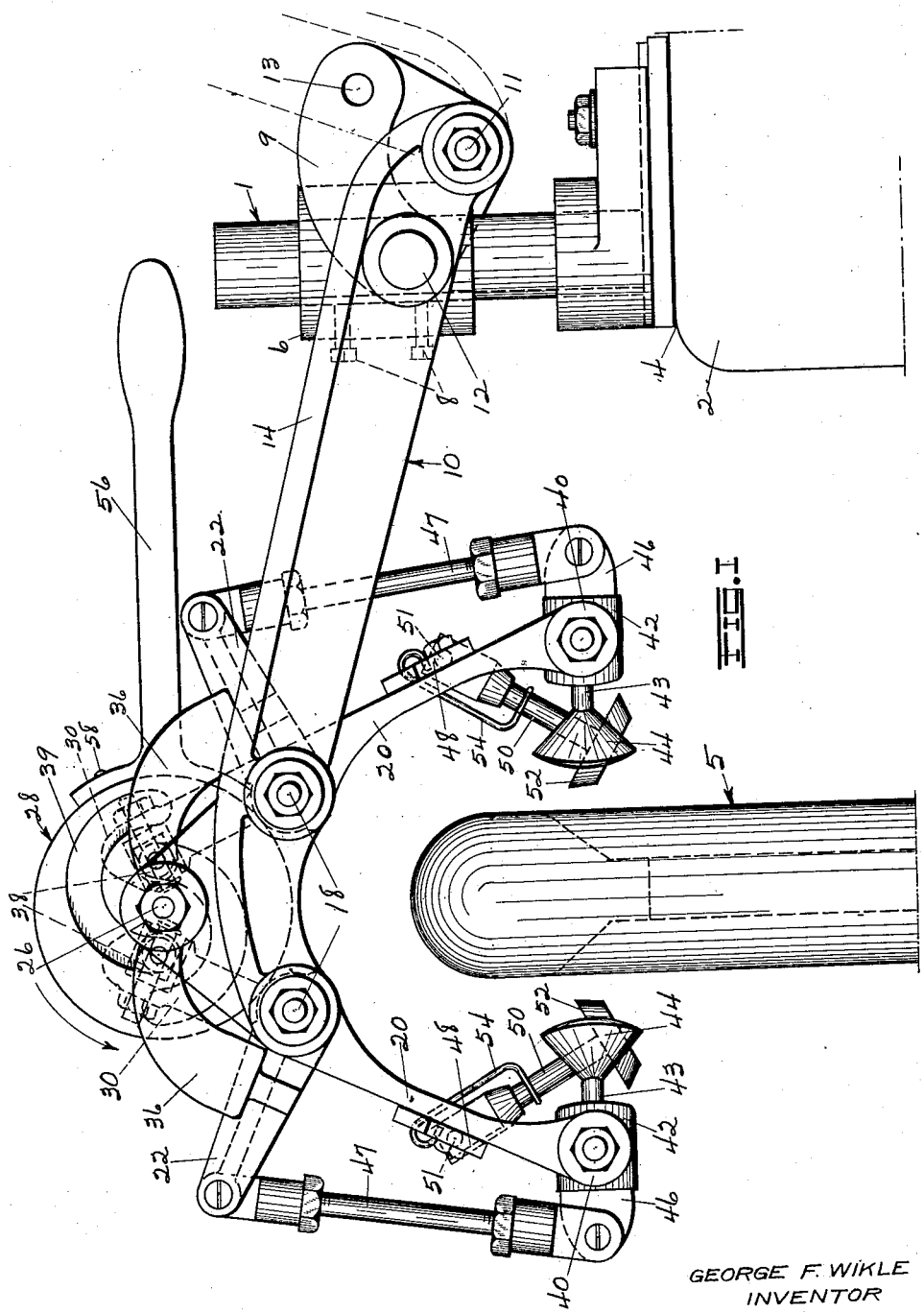

Nov. 1, 1927.

G. F. WIKLE 1,647,163

TIRE BUILDING MACHINE

Filed April 9, 1924

2 Sheets-Sheet 1

GEORGE F. WIKLE
INVENTOR

BY
ATTORNEY

Nov. 1, 1927.  G. F. WIKLE  1,647,163
TIRE BUILDING MACHINE
Filed April 9, 1924  2 Sheets-Sheet 2
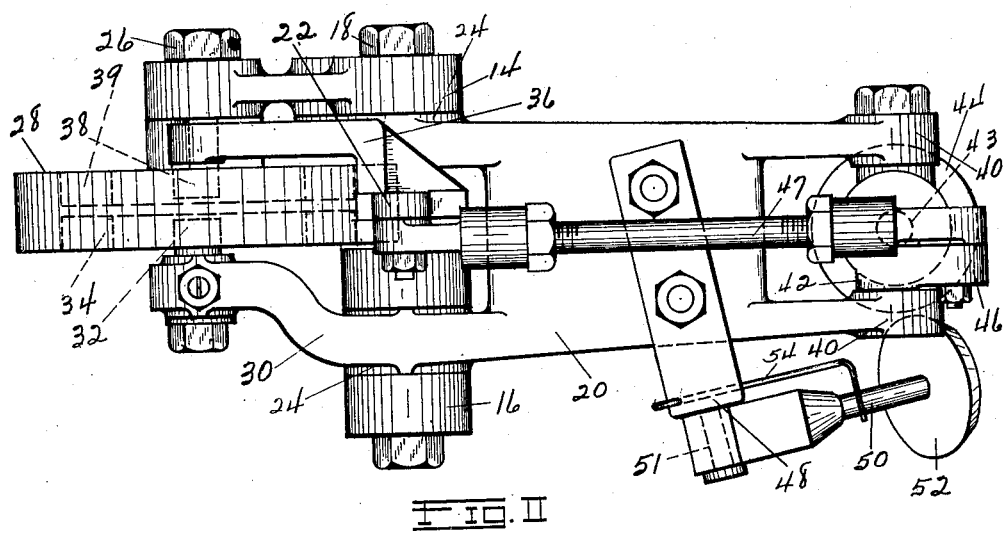
FIG. II
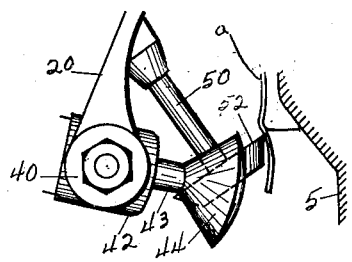
FIG. III
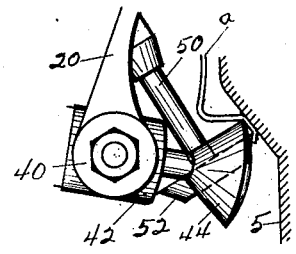
FIG. IV
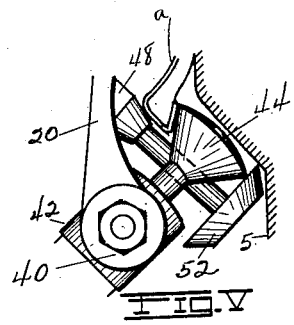
FIG. V
GEORGE F. WIKLE
INVENTOR
BY
ATTORNEY Patented Nov. 1, 1927.

1,647,163

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed April 9, 1924. Serial No. 705,377.

My invention relates to machines for building pneumatic tire casings and more particularly to a device for manipulating certain structural elements applied about the bead portion of the tire carcass.

In certain types of tire construction a strip of material is applied which extends below the bead and which it is desired to fold along the base of the bead and then inwardly behind the bead and against the interior of the casing. So far as I am aware this step has heretofore been carried out by hand and after the carcass has been removed from the building core. It is the main object of my invention to provide a device which will perform this operation while the carcass is still on the core and in a better and more efficient manner than is possible by hand. Other objects will appear from the specification and claims.

An illustration of a structural element of the character above referred to is the so-called chafing strip which constitutes the outer covering of the bead portion of the finished tire, and in the following specification and in the accompanying drawings I have shown one embodiment of my invention in relation to the manipulation of such a strip, but it will be understood that my invention is not limited thereto.

In the drawings,

Figure 1 is a plan view showing my device in relation to a tire building machine, Figure 2 is a side view of the mechanism shown in Figure 1, and Figures 3, 4, and 5 are diagrammatic views showing the steps in the operation of my device.

Referring to the drawings, a projecting stud 1 is secured at 4 to the housing 2 of a tire building machine provided with a power rotated core 5 which may be driven by any suitable mechanism such as is shown in co-pending application Serial Number 704,-497, filed April 5, 1924. A collar 6 is splined on said stud and held in longitudinally adjusted position thereon by means of set screws 8. Collar 6 is provided with a flat triangular portion 9 to which a bracket 10 is pivoted at 11 and the bracket 10 is provided with a pin 12 seating in sockets 13 to releasably lock the bracket in operative or inoperative position. Bracket 10 comprises upper and lower members 14 and 16 and the free ends of the bracket are provided with pins 18 supported in said members upon which are pivotally mounted arms 20 and bell crank levers 22. The arms 20 are provided with spaced bearings 24 through which pins 18 pass and levers 22 are pivoted on said pins between bearings 24 as shown in Figure 2. Rotatably mounted by means of pin 26 secured in upper member 14 of bracket 10 is a double faced cam 28 provided with a handle 56 which is secured to the edge of the cam by suitable screws 58. Arms 20 are provided with rearwardly extending members 30 carrying cam rolls 32 operating in cam groove 34 in the lower face of cam 28. Rearwardly extending arms 36 of levers 22 are provided with rolls 38 operating in grooves 39 in the upper face of cam 28. Arms 20 are provided at their free ends with lugs 40 in which are pivotally mounted bearings 42 carrying spindles 43 of stitching members 44. Bearings 42 are provided with lugs 46 which are connected to the levers 22 by adjustable links 47.

Downwardly projecting supports 48 are secured to arms 20 adjacent bearings 42. Shafts 50 pivotally secured to said supports at 51, carry freely rotatable fabric turning and guiding members 52. Shafts 50 are normally held in inward position as shown in Figure 1 by springs 54 secured to supports 48 and engaging shafts 50.

The operation is as follows. Power having been applied to the core to put it in rapid rotation the bracket 10 is swung from inoperative position, shown in dotted lines in Figure 1, to operative position shown in full lines. The operator then grasps the handle 56 and rotates cam 28 in the direction of the arrow in Figure 1. The cam grooves are so formed that the initial movement brings arms 20 and their associated parts to substantially the position shown in Figure 3. As shown in this figure members 52 first engage the chafing strip "a" and in their forward movement turn the chafing strip about the heel of the bead. Members 52 as above described are spring mounted and their function is merely to turn the chafing strip about the heel of the bead and guide it across the bottom of the bead in advance of members 44, the pressure exerted by springs 54 being only sufficient to keep the chafing strip in place against the bead until firmly applied by the stitchers 44. The latter members are strongly pressed against the base of the bead by the action of cam 28 and, following behind guides 52, they apply the chafing strip smoothly and firmly to the bead. The inward movement of arms 20 continues until stitchers 44 reach the toe of the bead as shown in Figure 4. The members 52, moving in advance of the stitchers, strike the core 5 and, as arms 20 move in to bring the stitchers to the toe of the bead, guides 52 yield against springs 54 assuming the position shown in Figure 4.

The arms 20 have now reached the inward limit of their swing but continued movement of cam 28 rotates bearings 42 in a clockwise direction as viewed in Figures 4 and 5, causing stitchers 44 to fold the chafing strip around the toe of the bead and along the inner side of the casing. During the rotation of bearings 42 arms 20 are maintained relatively stationary but as the movement is completed the arms under the influence of cam groove 34 are swung sharply outward a short distance causing stitchers 44 which are held relatively stationary to strip the casing from the sides of the core. This position, which completes the operation, is shown in Figure 5. Reverse movement of cam 28 returns arms 20 and their associated parts to their original position.

While for the sake of clearness the operative movements have been described as separate steps it will be understood that the operation is substantially continuous, requiring but a fraction of a minute to complete, and that cam 28 is moved without substantial interruption from initial to final position, and is then quickly reversed.

My device may be used with any type of building core such as a solid core or pneumatic cores of the type disclosed in my copending application above referred to.

I claim:

1. A device of the character described comprising a rotatable core adapted to support a tire carcass including bead elements and means to stitch an element of said carcass along the base of the bead and against the interior of the carcass.

2. A device of the character described comprising a rotatable core adapted to support a tire carcass including bead elements, means to turn an element of said carcass around the outer edge of the bead and means to stitch said element along the base of the bead and against the interior of the carcass.

3. A device of the character described comprising a rotatable core adapted to support a tire carcass including bead elements and means operable during rotation of the core to apply material to the exposed faces of the bead and the interior bead portion of the carcass.

4. A device of the character described comprising a rotatable core adapted to support a tire carcass including bead elements, stitching instrumentalities adapted to be positioned adjacent the bead elements and means to move said instrumentalities successively across the base of the bead, along a portion of the inner surface of the carcass and outwardly from the sides of the core.

5. A device for forming material about the bead portion of a tire carcass comprising a stitching member adapted to engage the material at the outer edge of the base of the bead and means to move said member in a predetermined path across the base of the bead and along the interior bead portion of the carcass.

6. A device for forming material about the bead portion of a tire carcass comprising a stitching member adapted to engage the material at the outer edge of the base of the bead and means to move said member successively across the base of the bead and radially along the interior bead portion of the carcass.

7. A device for forming material about the bead portion of a tire carcass comprising a stitching member adapted to engage the material at the outer edge of the base of the bead, means to move said member bodily across the base of the bead, and means to impart bodily movement to said member to swing the same radially along the interior bead portion of the carcass.

8. A device for forming material about the bead portion of a tire carcass comprising a stitching member adapted to engage the material at the outer edge of the base of the bead, means to move said member bodily across the base of the bead, and means to thereafter swing said member radially along the interior bead portion of the carcass, said first named means operable during a portion of the latter movement to move said member bodily in an outward direction.

9. A device for forming material about the bead portion of a tire carcass comprising means for turning the material about the outer edge of the base of the bead, a stitching member adapted to engage the material at said edge and means to move said member successively across the base of the bead and radially along the interior bead portion of the carcass.

10. A device for forming material about the bead portion of a tire carcass comprising a movable support, means yieldingly mounted thereon for turning the material about the outer edge of the base of the bead, a stitching member pivotally mounted on said support and means for swinging said member about its pivot.

11. A device for forming material about the bead portion of a tire carcass comprising pivoted arms, stitching members pivotally mounted in the free end of said arms, yielding members mounted on said arms, means to move said arms to bring said yielding members against the material and turn the latter around the outer edge of the base of the bead and on continued movement to carry said stitching members across the base of the bead and means operative as the arms reach their inner limit of movement to swing said stitching members about their pivots.

12. A device of the character described comprising a rotatable core, a support, arms pivoted thereon to swing towards and from the core, stitching means rotatably mounted in bearings pivoted on said arms said means adapted on the inward movement of the latter to apply a portion of a finishing element along the base of the bead of a tire casing supported on the core, and means to rotate said bearing to cause the stitching means to lay the remainder of the element along the inner face of the bead portion of the casing.

13. A device of the character described comprising a rotatable core, a support, arms pivoted thereon to swing towards and from the core, stitching discs rotatably mounted in bearings pivoted on said arms, each adapted on the inward movement of the arms to apply a portion of a finishing strip along the base of the bead of a tire casing supported on the core, means to rotate said bearings to cause the stitching discs to lay a further portion of the finishing strip along the inner face of the bead portion of the casing and a single means to control the extent and sequence of movement of said arms and bearings.

14. A device of the character described comprising a rotatable core, a support, arms pivoted thereon to swing towards and from the core, discs rotatably mounted in bearings pivoted on said arms, each adapted on the inward movement of the arms to stitch a portion of a finishing strip along the base of the bead of a tire casing supported on the core, means to rotate said bearings to cause the stitching discs to lay a further portion of the finishing strip along the inner face of the bead portion of the casing and a double faced cam, the cam grooves on the faces thereof controlling respectively the movement of said arms and said bearings.

15. A device of the character described comprising a rotatable core, a support, arms pivoted thereon to swing towards and from the core, instrumentalities pivoted on said arms and a cam provided with cam grooves formed to successively swing said arms toward the core, rotate said instrumentalities about their pivots and move said arms away from the core while maintaining said instrumentalities in rotated position.

16. A device of the character described comprising a rotatable core, a support, arms pivoted thereon to swing towards and from the core, stitching means rotatably mounted in bearings pivoted on said arms, said means adapted on the inward movement of the latter to apply a portion of a finishing strip along the base of the beads of a tire casing supported on the core, means to rotate said bearing to cause the stitching means to lay the remainder of the strip along the inner face of the bead portion of the casing and strip guiding members yieldingly mounted on said arms and operable in advance of said stitching means.

17. A device of the character described comprising a rotatable core a support adapted to be moved to operative position adjacent the core, arms pivoted to the support and adapted to be moved toward the sides of the core, stitching members pivotally mounted on said arms, rotatable guiding members yieldingly mounted on said arms adjacent the stitching members and operable in advance thereof, and a single cam provided, with a plurality of cam grooves, controlling the movement of said arms, and the member supported thereon, in predetermined paths.

18. In a device of the character described, a support, a bell crank pivoted thereon, a bearing pivotally mounted on one arm of said crank, a second bell crank, a link connecting one arm of the second bell crank and said bearing, the other arms of said bell cranks being provided with cam rollers operating in cam grooves formed in opposite faces of a cam member for imparting bodily and rotative movement to said bearing in a predetermined sequence.

19. In combination a rotatable core, a support, arms pivoted thereon to swing toward and from the core, carcass engaging means pivoted on said arms said means adapted on the inward movement of the arms to pass along the base of the beads of tire casing supported on said core and means to rotate said means about their pivots to cause said means to engage the inner faces of the bead portions of the casing.

20. In combination a rotatable core, a support, arms pivoted thereon to swing toward and from the core, carcass engaging members pivoted on said arms means to move said members bodily along the base of the beads of a tire casing mounted on said core, and means to thereafter rotate said members about their pivots to cause said members to engage the interior bead portions of the casing, said first named means being operable during a portion of the latter movement to move said members bodily in an outward direction.

In testimony whereof I have signed my name to the above specification.

GEORGE F. WIKLE.